United States Patent Office 2,924,620
Patented Feb. 9, 1960

2,924,620

PROCESS FOR THE PREPARATION OF DIPHENYLAMINES

Robert K. Miller, New Castle, Del., assignor to E. I. du Pont de Nemours and Company, Wilmington, Del., a corporation of Delaware No Drawing. Application March 30, 1959
Serial No. 802,664

5 Claims. (Cl. 260—576)

The present invention is directed to a novel method for producing diphenylamines; this invention is particularly useful in the preparation of unsymmetrical diphenylamines.

This application is a continuation-in-part of copending applications Serial No. 592,732, filed June 21, 1956 and application Serial No. 598,736, filed July 19, 1956, both applications now abandoned.

Diarylamines have long been important intermediates in the chemical industry. Recently they have been employed in the preparation of phenothiazines, particularly ring-substituted phenothiazines which are further converted into such N-substituted phenothiazines as 10-(3-dimethylaminopropyl)-2-chlorophenothiazine, a tranquilizing agent in medicinal use known as chloropromazine (see U.S. Patent 2,645,640 and British Patent 716,205).

Several general routes to diarylamines are known. One typical method, suitable for the preparation of symmetrical diphenylamines, consists of heating the primary aromatic amine with its corresponding hydrochloride, e.g., aniline and aniline hydrochloride yield ammonium chloride and diphenylamine; it is impractical for preparing unsymmetrical diphenylamines; e.g., heating aniline hydrochloride with toluidine gives a difficultly separable mixture of diphenylamine, methyldiphenylamine and dimethyldiphenylamine. More practical for the preparation of unsymmetrical diphenylamines is the Ullmann condensation which may be used in several modifications, all involving reaction of an aryl halide with an aryl amine in the presence of an activating substituent and a copper catalyst. In one modification, an ortho-haloaromatic carboxylic acid is condensed with an aromatic primary amine and the resulting orthocarboxy diarylamine is then thermally decarboxylated, e.g., 3-chlorodiphenylamine is obtained from either (a) 2,4-dichlorobenzoic acid and aniline or (b) 2-chlorobenzoic acid and 3-chloroaniline. A variation on the above method involves reacting anthranilic acid with bromobenzene to obtain the intermediate N-phenyl-anthranilic acid.

These processes suffer a major disadvantage in that introducing the activating carboxyl group into the reactant is costly and the diarylamine is obtained at the expense of the carboxyl group which is lost as $CO_2$ in an additional unit operation.

Another known routine to the preparation of diarylamines employs an aryl amine which is activated by a nitro group, such as o-nitroaniline or by an N-acetyl group. It is known that acetanilide and bromobenzene yield N-acetyl-diphenylamine, hydrolyzable to diphenylamine on heating in alcoholic hydrochloric acid for 3 hours (Goldberg, Berichte 40, 4541 (1907)); that N-acetyl o- (or p-) toluidine yields N-acetyl methyldiphenylamine, saponifiable in hot alcoholic alkali to the o- (or p-) methyldiphenylamine. (Weston and Adkins, Journ. Am. Chem. Soc. 50, 859 (1928).)

One disadvantage of this known method utilizing an N-acetyl group is that a time consuming costly hydroyltic step is required to remove the activating group. In the absence of the activating nuclear carboxyl group or the N-acetyl group, the reaction is either impractically sluggish or fails entirely. It is highly desirable that the activating group be easily and economically removed after it has served its purpose. Even with the activating N-acetyl group, the reaction is rather slow, about 20 to 24 hours at elevated temperatures being required to achieve practical yields of the product of the condensation.

It is an object of the present invention to utilize formanilides in the Ullmann condensation with aryl halides wherein the diarylamine is directly recoverable from the reaction mass.

It is a further object of this invention to eliminate the need for prolonged hydrolysis of the reaction product obtained from N-acetyl primary aromatic amine and aryl halide.

It is a further object of this invention to produce unexpectedly high yields of diarylamine.

It is a specific object of the present invention to provide a simplified and economically practical Ullmann condensation method for preparing 3-chlorodiphenylamine.

It is a specific object of the present invention to provide a simplified and economically practical Ullmann condensation method for preparing both symmetrical and unsymmetrical diphenylamines.

The present invention is based on the use of formanilides in lieu of the prior art acetanilides in the production of diphenylamines on condensation with aryl halides in the presence of a copper Ullmann condensation catalyst and potassium or sodium carbonate as acid acceptors. It has been discovered that, when formanilides rather than the acetanilides suggested in the prior art are employed in the Ullmann condensation, the reaction time is significantly shortened and the product of the condensation obtained in higher yield.

In one embodiment of the present invention symmetrical and unsymmetrical diphenylamines are obtained by reacting (A) a compound taken from the group consisting of formanilide and the alkyl, alkoxyl, fluoro and chloro substituted formanilides with (B) a compound taken from the group consisting of bromobenzene, iodobenzene and alkyl, alkoxyl, fluoro and chloro substituted bromo and iodobenzenes in the presence of a copper Ullmann condensation catalyst and potassium carbonate at a temperature within the range of 170–240° C. and recovering the diphenylamine from the reaction mass.

It has also been discovered that when potassium carbonate is employed as the acid-acceptor in this condensation the diphenylamines rather than the expected N-acyl diphenylamines are obtained directly from the reaction mass as the major product. Thus the hydrolytic step of the prior art is no longer necessary and the process is unexpectedly simplified. Furthermore, use of a formanilide materially shortens the required time and the overall yield of the diphenylamine is substantially as good as or better than that obtained following the old practice.

Another embodiment of the present invention comprises reacting (A) a formanilide with (B) bromobenzene in the presence of a copper Ullmann condensation catalyst and sodium carbonate at a temperature within the range of 170–240° C. and recovering the diphenylamine from the reaction mass after hydrolyzing the reaction product.

The prior art describes the use of a wide variety of acetanilides and phenyl bromides (and iodides) in the Ullmann condensation reaction; that is, these reactants may contain alkyl, alkoxyl, chloro and fluoro groups, all of which are inert under the conditions of the condensation reaction as more fully described below. Thus, proper selection of the organic reactants affords N-acetyldiphenylamines which are substituted in one phenyl ring by one or more substituents and are unsubstituted in the other phenyl ring, or which are substituted in both phenyl rings by the same or different groups which may occupy the same or different positions on the two phenyl rings.

The point of the invention resides in the presence of the N-formyl group and is independent of the presence of other substituents on the phenyl rings in the organic reactants so long as these other substituents are inert (i.e., unaltered) under the conditions of the Ullmann condensation. Alkyl, alkoxyl and halo groups other than bromo and iodo are inert substituents in this reaction and may be present in either of the organic reactants.

The alkyl substituents are preferably lower-alkyl groups of from 1 to 4 carbon atoms, particularly methyl and ethyl, for reasons of economy and availability of the subject intermediates. Likewise the preferred alkoxyl groups are methoxyl, ethoxyl, propoxyl, and butoxyl, particularly methoxyl. A fluoro or chloro group, in contrast to bromo- or iodo-, is relatively inert under conditions of the reaction, and, as indicated above, may be present in either of the reactants.

Representative formanilides which may be employed according to the method of this invention are: formanilide, m-fluoroformanilide, m-chloroformanilide, N-formyl-o- (or p-) toluidine, N-formyl-m-ethylaniline, m-methoxyformanilide, 2,4-dimethylformanilide, and the like as defined.

Representative phenylhalides are: bromobenzene, iodobenzene, p-bromotoluene, m-fluoro-bromobenzene, p-iodochlorobenzene, m-methoxybromobenzene, p-methoxybromobenzene, 2,4-dimethylbromobenzene, and the like.

In general, any of the formanilides may be employed with any of the phenyl bromides or iodides for the preparation of symmetrical or unsymmetrical diphenylamines. The method of this invention is particularly useful for preparing unsymmetrical diphenylamines, since such amines are difficultly or not at all obtainable free of isomers by the more conventional methods. Thus by proper selection of the organic reactants, diphenylamines may be obtained which are substituted in one phenyl ring by one or more substituents and unsubstituted in the other; or which are substituted in both phenyl rings by the same or different groups which may occupy the same relative positions or different positions on the two phenyl rings.

Representative diphenylamines which may be prepared according to the present invention are diphenylamine, 2- and 4-methyldiphenylamine, 2,4'-dimethyldiphenylamine (ditolylamine), 3,4,3',4' - tetramethyldiphenylamine, 3-fluorodiphenylamine, 3 - chlorodiphenylamine, 3,3' - dichlorodiphenylamine, 3 - methoxydiphenylamine, 4 - methoxydiphenylamine, 3 - methoxy - 3' - methyldiphenylamine, and the like as defined above. In the preferred embodiment of the invention, 3-chlorodiphenylamine is prepared by reacting m-chloroformanilide (N-formyl-m-chloroaniline) with bromobenzene.

Except for the use of a formanilide rather than an acetanilide, the present process follows the practice of the art with regard to the general reaction conditions. Best results are generally obtained in the absence of solvent or diluent, while employing substantially anhydrous materials under anhydrous conditions. In the preferred general method, a mixture consisting of a formanilide, such as N - formyl - m - chloroaniline, an aryl halide such as bromobenzene, and potassium carbonate acid-acceptor and an Ullmann condensation catalyst such as copper or a compound of copper is heated to and held at temperatures ranging from about 170 to 220° C. at normal pressures, until stoichiometric equivalents of the organic reactants are substantially consumed.

It is preferred to employ approximately stoichiometric quantities of the organic reactants in the absence of additional solvent or diluent. If desired, however, either of the organic reactants may be in excess. In the preparation of the preferred 3-chlorodiphenylamine, for example, best results are obtained if bromobenzene is employed in not more than 50 mol percent excess and for reasons of economy not more than 5 mol percent excess. When relatively large excesses of bromobenzene are present, the refluxing excess tends to maintain the reaction mass at the lower temperature limit, and, unless superatmospheric pressures are employed to raise the boiling point of the mixture, the time required to complete the condensation is materially lengthened. An excess of N-formyl-m-chloroaniline of up to about 20 mol percent is practical; however, as stated above, for best results and for reasons of economy, approximately stoichiometric quantities of organic reactants are employed.

The rate of condensation becomes practical at temperatures of approximately 170±5° C. and above. With bromobenzene as the arylhalide, this initial lower temperature corresponds to the reflux temperature of the mixture. While external heat is being applied, the reflux temperature of the mass rises as bromobenzene is consumed. Although the reaction proceeds at the lower end of the stated temperature range it is preferred to allow the temperature of the reaction mass to rise to 200–220° C. Loss of the formyl group (when potassium carbonate is the acid-acceptor) takes place more rapidly at the higher than at the lower temperatures. Temperatures of up to about 240° C. may be employed. In general no further advantages are gained on exceeding 240° C., and it is seldom necessary to exceed 220° C. to achieve an economically practical rate of reaction. The heat input is then regulated to maintain the mass at these temperatures, preferably at about 210° C. In the condensation step, the formyl derivatives are remarkably more reactive than the corresponding acetyl derivatives. For example, the time required to reach the maximum preferred temperature is cut by a factor of about 4 when m-chloroacetanilide is replaced by m-chloroformanilide under comparable conditions; the holding time at the higher temperature to complete the condensation is also shortened with the result that the overall reaction time is cut in half. The actual times required depend upon such factors as the particular organic reactants and their mol ratios, and on the nature of and quantities of the copper catalyst and acid-acceptor.

A variety of Ullmann condensation catalysts may be employed. By Ullmann condensation catalyst is meant metallic copper in suitable form and compounds of copper which are normally engaged in the art to effect condensations of this type. Representative and suitable catalysts are copper powder, copper-bronze powder, copper and iodine mixture, copper halides such as cuprous iodide, cuprous bromide and cuprous chloride, cupric carbonate, cupric acetate and the like described in the art, preferably cupric carbonate. Only relatively small quantities of catalyst are required; practical quantities are from about 1 to 10% by weight of the formanilide. Lesser quantities do not always provide for consistently practical rates of condensation, while larger quantities, though operable, do not always provide additional advantages commensurate with increased cost. About 3% by weight of cupric carbonate is preferred.

The acid-acceptor, potassium or sodium carbonate, will be employed in quantities providing from one to three equivalents, preferably at least two equivalents (one molar equivalent), based on the theoretical quantity of halide to be produced in the metathetical reaction between the formanilide and the aryl halide reactants.

The detailed mechanism of the present invention wherein potassium carbonate is the acid-acceptor and wherein the formyl group is removed is not known with certainty; it appears that this unexpected result is intimately associated with potassium bicarbonate which is produced in situ in the reaction mass. A possible explanation is that the potassium bicarbonate decomposes, in the temperature range employed, into potassium carbonate, $CO_2$ and $H_2O$; said water produced in situ removes the formyl group from the N-formyldiphenylamine.

As stated earlier, Ullmann condensations of the present type proceed best using anhydrous substances under anhydrous conditions. However, in the present invention it is not critical to prepare and maintain completely anhydrous reactants and reagents. To do so is inconvenient, time-consuming and costly. Instead, we employ materials which are normally considered by those skilled in the art to be anhydrous, i.e., not obviously grossly contaminated. In practice small quantities of water invariably begin to appear in the refluxing vapor in the initial stages of the reaction. At the reaction temperatures employed the water is readily removed from the reaction zone as the azeotrope with the aryl halide, e.g., bromobenzene.

The diphenylamine produced according to the method of this invention, with potassium carbonate as acid-acceptor, is readily isolated from the crude reaction mass in high yield under non-hydrolytic conditions. The reaction mass may be extracted with an organic solvent such as benzene, chlorobenzene, o-dichlorobenzene and the like to separate the organic from inorganic components, and the extract evaporated to recover the crude product, which, if desired, may be distilled, or crystallized from conventional solvents. Alternately, the reaction mass may be drowned in water, the organic layer separated and either distilled or crystallized in the usual way. Steam-volatile products such as diphenylamine may be steam distilled directly from the reaction mass. Occasionally it is found that the crude products contain up to 10% of carbonyl compounds, calculated as the N-formyldiphenylamine. These may be removed by fractionally distilling the organic product, or where the diphenylamine is a solid, by crystallization from solvents.

m-Chloro-diphenylamine prepared according to the method of this invention is suitable for the preparation of 2-chloro-phenothiazine following the procedures described in the art.

Example 1

A mixture consisting of 226.4 parts (1.87 mols) formanilide, 294 parts (1.87 mols) bromobenzene, 345.2 parts (2.5 mols) potassium carbonate, and 5 parts (0.04 mol) cupric carbonate was heated to reflux (168° C.) while being stirred. During this time, any two-phase condensate which appeared was separated in an azeotropic distillation head, the water being discarded and the bromobenzene returned to the reaction vessel. The temperature of the mass rose from 168° C. to 205° C. in 2.5 hours. The external source of heat was then regulated to maintain the contents of the reaction vessel at 210±5° C. for 10 hours. The charge was cooled to about 100° C., thoroughly extracted with chlorobenzene (600 parts) and filtered. The filtrate was stripped of chlorobenzene under reduced pressure and distilled at 10 to 15 mm. Hg pressure: 261.2 parts (82.6% yield) of diphenylamine were collected, boiling in the range 155 to 175° C. and melting in the range 36 to 48° C. Analysis of the infrared spectrum showed less than 5% of carbonyl-containing substance, calculated as N-formyldiphenylamine. Recrystallized from a 1:2 mixture of benzene and petroleum ether this product melted at 49.5–51.5° C. (no depression on admixture with authentic diphenylamine, M.P. 53° C.), and had no carbonyl band in its infrared spectrum which was identical to that of authentic diphenylamine.

Equally good or somewhat better yields are obtained on working up the reaction mass by alternate methods: For example, (a) the benzene extract of the reaction mass, instead of being distilled is concentrated to small volume, diluted with petroleum ether and chilled to obtain pure crystalline diphenylamine; (b) the reaction mass is drowned in water, the organic components removed and distilled to obtain pure product boiling at 160–165° C. and 5 mm. Hg pressure; (c) the reaction mass is drowned in water and steam distilled to recover the diphenylamine.

Example 2

A mixture consisting of 155.6 parts (1.0 mol) m-chloroformanilide, 157 parts (1.0 mol) bromobenzene, 172.6 parts (1.25 mol) potassium carbonate, and 10 parts (0.081 mol) cupric carbonate was heated to reflux (166° C.) while being stirred. Any two-phase distillate that appeared during this period was condensed and separated in an azeotropic distillation head, the water being discarded and the bromobenzene returned to the reaction vessel. As bromobenzene was consumed the temperature rose, in 55 minutes, to 207° C. The reaction mass was held at 205±5° C. for 10 hours, cooled, and extracted with 800 parts carbontetrachloride. The extract after being filtered through Celite (a filter aid) was concentrated in vacuo and then distilled to give:

| Fraction | B.P., °C. | Press., mm. Hg | Wt., Parts | $n_D^{20}$ |
|---|---|---|---|---|
| A | 128–141 | 0.5–0.1 | 141.1 | 1.6483 |
| B | 141–153 | 0.6 | 9.7 | 1.6432 |

Fractions A and B combined represent a yield of approximately 74% of 3-chlorodiphenylamine containing roughly 10% of the N-formyl derivative as determined by analysis of the infrared spectrum.

Fraction A was redistilled to yield as a main cut, 95.0 parts (46.6% yield) of substantially pure m-chlorodiphenylamine, identical to an authentic sample in boiling range (117–120° C. at 0.2 mm. Hg), refractive index ($n_D^{20}$ 1.6503), quantitative elemental analysis (for C, H, N, Cl) and infrared spectrum. This sample, now containing less than 5% of carbonyl compound, is suitable for conversion into 2-chlorophenothiazine (approximately 60% yield, M.P. 198–200° C.) by fusing with sulfur in presence of iodine, following the method described in British Patent 716,205.

In the above example simple distillation technics were employed in isolating the product. If pure 3-chlorodiphenylamine is required, i.e., essentially free of carbonyl-containing impurity, the crude reaction product is fractionated through a packed multi-plate distillation column, overall yields of at least 60% of rectified product being obtained.

Example 3

The procedure of Example 2 was repeated using 311.2 parts m-chloroformanilide, 350 parts bromobenzene, 345 parts potassium carbonate and 25 parts copper carbonate. The total reaction time was 11.5 hours. The reaction mass was cooled to about 100–110° C. and filtered. The inorganic filter cake was thoroughly washed with approximately 600 parts chlorobenzene, and the combined filtrate and washings were stripped in vacuo of the solvent. The residue was distilled at 0.2 to 0.5 mm. of Hg to give 1.2 parts boiling at 30–105° C. and 316.8 parts of crude 3-chlorodiphenylamine, B.P. 117–160° C., $n_D^{20}$ 1.6458.

291.2 parts of the crude 3-chlorodiphenylamine was rectified at 10 mm. Hg pressure through a 24-inch column (rated at about 20 theoretical plates) and at a reflux ratio of 10/1.

| Fraction | Boiling Range, °C. | Weight, Parts | $n_D^{20}$ | Percent Carbonyl[1] |
|---|---|---|---|---|
| 1 | 102–180 | 9.1 | 1.6308 | high |
| 2 | 182 | 8.2 | 1.6498 | 3.0 |
| 3 | 183 | 70.5 | 1.6508 | 0.9 |
| 4 | 184 | 158.3 | 1.6512 | 1.4 |
| 5 | 188 | 20.8 | 1.6501 | 6.0 |
| 6 | 195 | 6.9 | 1.6463 | high |
| 7 | 208 | 6.9 | 1.6355 | high |
| Residue | | 10.0 | | |

[1] Infrared analysis: The impurity in fraction 1 is m-chloroformanilide; fractions 6 and 7 show high content of N-formyl 3-chlorodiphenylamine. Fractions 2, 3, 4 and 5 represent a 67.9% yield of 3-chlorodiphenylamine.

Example 4

A mixture consisting of 155.6 parts (1 mol) m-chloroformanilide, 157 parts (1 mol) bromobenzene, 207 parts (1.5 mols) potassium carbonate, and 10 parts (0.081 mol) cupric carbonate was treated as described in Example 2. The temperature rose from the initial reflux temperature of 167° C. to 208° C. in 1.5 hours. After being held at about 210° C. for 10 hours, the reaction mass was cooled to 100° C. and stirred into 1000 parts water. The water-immiscible organic layer was removed and distilled:

| Fraction | B.P., ° C. | Press., mm. Hg | Wt., Parts | $n_D^{20}$ |
| --- | --- | --- | --- | --- |
| A | 112–123 | 0.1–0.2 | 143.3 | 1.6501 |
| B | 123–128 | 0.1–0.2 | 4.9 | 1.6477 |
| C | 132–143 | 0.1–0.2 | 7.3 | 1.6445 |

Fraction A corresponds to a 70% yield of m-chlorodiphenylamine containing less than 5% of carbonyl compound. B and C are less pure in that they contain larger quantities of carbonyl compound as shown by their infrared absorption spectra. Pure 3-chlorodiphenylamine (B.P. 120±5° C. at 0.1 to 0.3 mm. Hg, $n_D^{20}$ 1.6503) may be obtained free of carbonyl impurity by rectification through a multi-plate distillation column.

Example 5

121.1 parts (1.00 mol) of formanilide, 200 parts (1.07 mol) of p-bromoanisole, 172.6 parts (1.25 mol) of potassium carbonate, and 2.5 parts of cupric carbonate were stirred and heated together at 210±5° C. for 15 hours. During this time about 10 parts of water was collected as distillate. The reaction mass was cooled, extracted with 550 parts of chlorobenzene and filtered, the filter cake was washed with 250 parts chlorobenzene and the combined filtrate and washings were evaporated under reduced pressure at a pot temperature of up to 110° C. The oily crystalline residue was recrystallized from 220 parts of methanol to yield 119.3 parts of 4-methoxydiphenylamine, M.P. 101–103° C. in 59.9% yield. Further recrystallization from methanol or benzene raises the melting point to a maximum of 105–106° C. 4-methoxydiphenylamine, prepared from p-acetoanisidine and bromobenzene, is reported to melt at 105° C. (Wieland and Wecker, Ber. 43, 708).

Example 6

A mixture consisting of m-chloroformanilide, 155.6 parts; bromobenzene, 157 parts; sodium carbonate, 159 parts; copper carbonate, 3.5 parts was heated to reflux while being stirred; the temperature of the stirred reaction mass rose to 208° C. in 2 hours. The reaction mass was then held at 200–210° C. for 10 hours. During this time, any two-phase condensate which appeared was separated in an azeotropic distillation head, the water being discarded and the bromobenzene returned to the reaction vessel. The mixture was cooled somewhat and 165 parts methanol was added slowly (any methanol vaporized by the hot mixture was condensed and returned to the reaction vessel), followed by 118 parts concentrated (36% by wt.) hydrochloric acid. The mixture was heated under reflux for 4 hours and then drowned in 850 parts water. The oil layer was separated and distilled at reduced pressure to give 149 parts (73% yield) of pure 3-chlorodiphenylamine.

In general when this experiment is repeated using sodium carbonate and the crude N-formyl-3-chlorodiphenylamine is hydrolyzed in hot alcoholic mineral acid or in hot alcoholic alkali, the yields of pure 3-chlorodiphenylamine range from 70 to 80%.

If m-chloroacetanilide (169.7 parts) is employed instead of m-chloroformanilide (155.6 parts) in the above example, the time required for the temperature of the reaction mass to reach 208° C. is 8 hours. Holding the reaction mass at 200–210° C. for 16 hours more and then hydrolyzing and working up as described above gives pure 3-chlorodiphenylamine in yields of 60 to 70%.

Since in general it is found that increasing the reaction time at 210° C. results in somewhat better yields, the above example shows that m-chloroformanilide is much more reactive than m-chloroacetanilide under comparable conditions and affords higher yields of 3-chlorodiphenylamine.

In the above examples powdered metallic copper or copper bronze or copper salts, e.g., cuprous iodide or chloride, may replace cupric carbonate with similar results being obtained.

In the examples given, the reactors were heated by electrical means; however, for commercial use, especially on a large scale, it is preferred to circulate hot vapor, such as superheated steam or a hot liquid, such as Dowtherm through a jacketed vessel to maintain the reaction mass at the desired temperature within the range of 170–240° C. This latter method of heating avoids local overheating and charring of the charge resulting in improved overall yields of the desired end product.

Substantially identical results are achieved in Examples 1 to 5 by replacing formanilide and m-chloroformanilide by other substituted formanilides such as 2-methylformanilide, 4-methylformanilide, 3-ethylformanilide, 3,4-dimethylformanilide, and 3-methoxyformanilide to yield directly the corresponding unsymmetrical diphenylamines. Likewise, instead of bromobenzene and 4-methoxybromobenzene in the above examples, analogs and homologs such as 3-bromoethylbenzene, 4-iodotoluene, 3-methoxybromobenzene, 4-ethoxyiodobenzene and 3-chloroiodobenzene may be employed with any of the formanilides listed above to produce directly the symmetrically- and unsymmetrically-substituted diphenylamines described earlier in the specification. Thus, condensation of m-chloroformanilide with 3-chloroiodobenzene yields 3,3'-dichlorodiphenylamine; condensation of 3-methoxyformanilide with 3-methoxyiodobenzene yields 3,3'-dimethoxydiphenylamine; condensation of N-formyl-p-toluidine with 4-ethoxyiodobenzene yields 4-methyl-4'-ethoxydiphenylamine.

If the corresponding N-acetylanilines are employed in the above Examples 1 to 5 the products are the N-acetyldiphenylamines. In a control experiment using m-chloroacetanilide it is found that the time required for the temperature of the reaction mass to rise to the preferred maximum temperature of about 210° C. is about 4 times and the overall reaction time about 2 times that for the m-chloroformanilide. To convert the resulting reaction mass to 3-chlorodiphenylamine it has to be heated for 3 to 4 hours in alcoholic hydrochloric acid or in alcoholic caustic to split off the acetyl group. Best yields obtainable under these conditions are 60–65%. On the other hand, if the reaction mass obtained in controlled experiments using m-chloroformanilide is also subjected to the same hydrolytic conditions the yield of 3-chlorodiphenylamine by this longer process is of the order of 70–79%.

The process of the present invention offers unexpected and beneficial results. The formanilides are more easily and more economically prepared, requiring only aqueous formic acid for formylation whereas acetylation is best accomplished by means of the anhydride. Furthermore, the formanilides are much faster reacting in the Ullmann condensation, in general about half the time being required to obtain yields of diphenylamine which are on the average higher than those obtainable with the acetanilides.

As many apparently widely different embodiments of this invention may be made without departing from the spirit and scope thereof, it is to be understood that the invention is not limited to the specific embodiments thereof except as defined in the appended claims.

The embodiments of the invention in which an exclusive property or privilege is claimed are defined as follows:

1. The process of preparing symmetrical and unsymmetrical diphenylamines which process comprises reacting (A) a compound taken from the group consisting of formanilide, alkyl-substituted formanilides, alkoxyl-substituted formanilides, fluoro-substituted formanilides, and chloro-substituted formanilides with (B) a compound taken from the group consisting of bromobenzene, iodobenzene, alkyl-substituted bromobenzene, alkoxyl-substituted bromobenzene, fluoro-substituted bromobenzene, chloro-substituted bromobenzene, alkyl-substituted iodobenzene, alkoxyl-substituted iodobenzene, fluoro-substituted iodobenzene, and chloro-substituted iodobenzene in the presence of a copper Ullmann condensation catalyst and potassium carbonate at a temperature within the range of 170 to 240° C. and recovering the corresponding diarylamine directly from the reaction mass.

2. The process of claim 1 wherein the Ullmann condensation catalyst is taken from the group consisting of copper, copper bronze, cuprous chloride, cuprous bromide, cuprous iodide and cupric carbonate.

3. A process for the preparation of 3-chlorodiphenylamine which comprises reacting m-chloroformanilide with bromobenzene in the presence of cupric carbonate as catalyst and potassium carbonate as acid-acceptor at a temperature within the range of 170 to 220° C. and recovering the 3-chlorodiphenylamine from the reaction mass.

4. The process for the preparation of 3-chlorodiphenylamine which comprises reacting m-chloroformanilide with bromobenzene in the presence of a copper Ullmann condensation catalyst and sodium carbonate as acid-acceptor at a temperature within the range of 170–220° C., followed by hydrolysis of the resulting N-formyldiphenylamine and recovering 3-chlorodiphenylamine from the reaction mass.

5. The process of claim 4 wherein the copper Ullmann condensation catalyst is taken from the group consisting of copper powder, copper bronze, cuprous bromide, cupric carbonate, cuprous iodide and cuprous chloride.

References Cited in the file of this patent

UNITED STATES PATENTS 2,572,067    Smith _____ Oct. 23, 1951

OTHER REFERENCES

Weston et al.: Journal of the American Chemical Society, vol. 50, pp. 859–866 (1928).

Goldberg: Deutsche Chemische Gesellschaft (Berichte), vol. 40, pp. 4541–4546 (1907).